Figure 1:
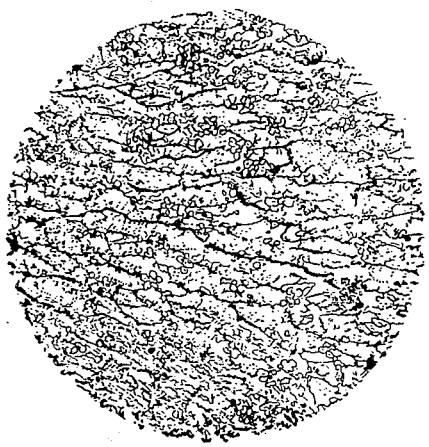

June 21, 1932.  H. W. GILLETT ET AL  1,864,240
BEARING ALLOYS
Filed March 26, 1932   2 Sheets-Sheet 2

INVENTORS.
Horace W. Gillett.
Howard C. Cross.
BY
ATTORNEYS

Patented June 21, 1932

1,864,240

UNITED STATES PATENT OFFICE

HORACE W. GILLETT AND HOWARD C. CROSS, OF COLUMBUS, OHIO

BEARING ALLOYS

Application filed March 26, 1932. Serial No. 601,406.

Our invention relates to bearing alloys. It has to do, particularly with alloys for use in bearings or bearing linings for automobiles, busses, aircraft and in similar fields, although it is capable of use in other connections.

In the prior art, the vast majority of bearings or bearing linings now in use have a tin or lead base. Though bearings of this type give reasonable satisfaction under some conditions, they do not stand up well under the high speeds and high pressures to which many engine bearings are subjected under present day conditions of operation.

For example, it is constantly being demonstrated in present day operations that tin or lead base bearings have too low a melting point to resist the high temperatures which are frequently created therein either by high speeds or high pressures or by both, or are otherwise deficient in essential properties at elevated temperatures. Likewise, it is being made more and more evident that these tin or lead base bearings do not possess adequate toughness, hardness and conformability to meet many present day conditions. They tend to "squash out", crack or otherwise deteriorate.

Some effort has been made by prior patentees, to depart from the tin or lead base for bearing alloys. Such efforts have included alloys containing cadmium, zinc and antimony, alloys containing cadmium and magnesium and alloys containing cadmium and copper.

However, these patentees have apparently failed to realize the necessity of meeting certain requirements vital to success in bearing alloys which must operate under high speed or pressure conditions, with the result that their alloys contain materials or relative percentages of materials which render them unsuitable. In other words, they are deficient in one or all of the qualities of high melting point, toughness, conformability and hardness.

The object of this invention is to provide an alloy for a bearing which will be superior to prior art bearings in that it will combine, to the most desirable extent, the qualities of high melting point, roughness, conformability and hardness, and will have especially improved properties at elevated temperatures.

In the making of our invention, we have discovered that a bearing alloy will possess the qualities of heat resistance or high melting point, toughness, conformability and hardness to an unusually satisfactory extent if the matrix thereof is formed of cadmium and zinc in properly selected proportions to each other and to the bearing alloy as a whole and if this matrix is reinforced by hard metal particles of sufficient smallness and quantity. Thus, we have found that a cadmium-zinc matrix will possess, to an unusual degree, the qualities of heat resistance, toughness and conformability, provided the cadmium and zinc are properly proportioned in relation to each other. And, we have found that this matrix, when supplemented by small particles of one or more metals which form stable intermetallic compounds with cadmium or zinc while maintaining a melting point not substantially lower and a degree of hardness no lower than the cadmium-zinc eutectic, produces a bearing alloy of unusual hardness which still retains the high degree of heat resistance, toughness and conformability characteristic of the matrix.

More specifically, our invention preferably takes the form of a ternary alloy comprising cadmium, zinc and antimony, with the cadmium and zinc or a ternary alloy of cadmium, zinc and antimony forming the matrix and the antimony forming, in this matrix, small hard particles which are probably antimony-zinc or antimony-cadmium compounds. Furthermore, our alloy, preferably, contains the cadmium and zinc in such proportion to each other that the eutectic structure is the preponderating factor in the matrix, with practically no excess cadmium and a comparatively small amount of excess zinc. Likewise, the cadmium and zinc are, preferably, in such proportion to the alloy as a whole that the antimony is only a comparatively small portion of the alloy.

For the purpose of this application (specification) the term "eutectic" or "cadmium-zinc eutectic" is used to represent the binary eutectic of cadmium and zinc, or the resulting similar structure in the alloys containing antimony, in which case the structure may in reality be a ternary eutectic of three metals. Likewise, antimony is referred to as a constituent of the structure of the alloys, whereas it is believed that antimony forms, for the most part, compounds with the cadmium or the zinc.

In making this alloy, these metals are preferably melted together and permitted to gradually cool, or the molten alloy may be directly formed into bearings or bearing linings. It will be understood that the antimony compounds and the excess zinc first solidify, and then the cadmium-zinc, or possibly a ternary cadmium-zinc-antimony eutectic solidifies, forming the matrix. There results an alloy which is primarily made up of the eutectic structure, which alloy contains a small amount of excess zinc and small particles that are antimony-zinc or antimony-cadmium compounds.

This application is a continuation in part of our application Serial Number 439,829, filed March 28, 1930, allowed November 20, 1931.

Since the various constituents of our alloy are visible under the microscope we are appending, hereto, drawings showing reproductions of a series of photomicrographs which illustrate, first, the appearance of the cadmium-zinc eutectic which forms the major portion of our bearing alloy and, second, the appearance of a series of alloys made in accordance with our invention and all embodying the cadmium-zinc eutectic but with different percentages of excess zinc and antimony forming parts of the various alloys.

While these different views of the drawings do not cover the entire range of compositions which may be produced within the scope of our invention, they are illustrative, to some extent, of the difference in characteristics which are produced by variations in the percentages of the metals used. In these drawings, which are taken from photomicrographs at a magnification of 50 diameters, slightly enlarged in reproduction.

Figure 1 is a photomicrograph showing the structure of the cadmium-zinc eutectic matrix alone.

Figure 2:
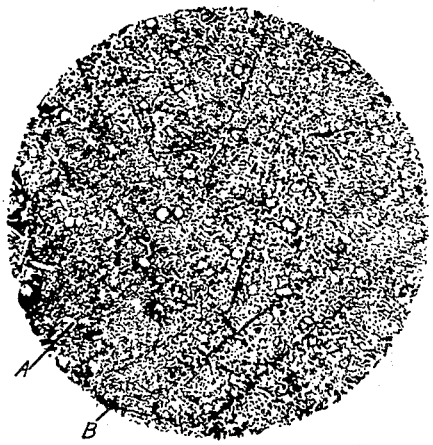

Figure 2 is a photomicrograph of an alloy consisting substantially of 70.5% cadmium, 24.5% zinc, 5% antimony, the cadmium and zinc being in the ratio to form 85% of the cadmium-zinc eutectic and 10% excess zinc, with the remaining 5% of the alloy being antimony. The relative amounts of these different structural constituents are slightly modified by the combination of the antimony with the cadmium or zinc to form compounds.

Figure 3:
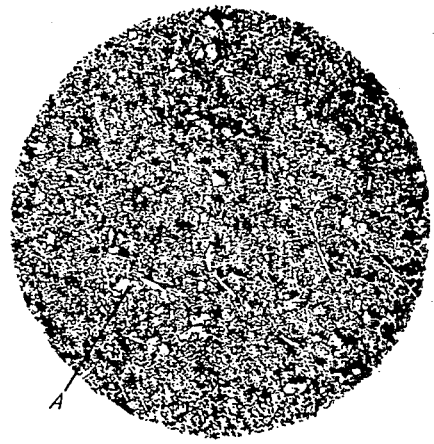

Figure 3 is a photomicrograph of an alloy consisting substantially of 78.85% cadmium, 16.15% zinc and 5% antimony, the cadmium and zinc, being in the proportion at which they ordinarily combine to produce a eutectic structure which would constitute 95% the weight of the total alloy, whose other 5% would be antimony. However, some of the cadmium or zinc combine with the antimony to form compounds, thus slightly modifying the proportions of the different structural constituents.

Figure 4:
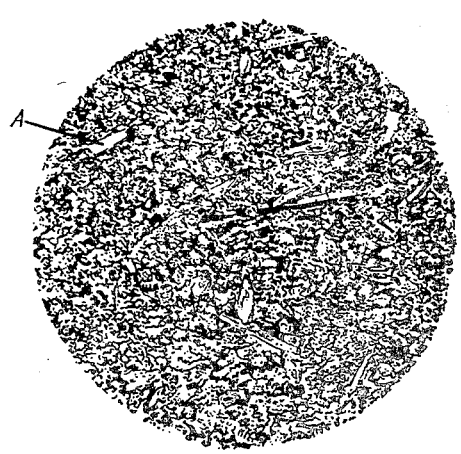

Figure 4 is a photomicrograph of an alloy consisting substantially of 70.55% cadmium, 14.45% zinc and 15% antimony, which combine to form a cadmium-zinc eutectic matrix, constituting 85% by weight of the total alloy, whose other 15% would be antimony, but here again the relative amounts of the different constituents of the microstructure are slightly modified, due to the formation of compounds with the antimony.

Figure 5:
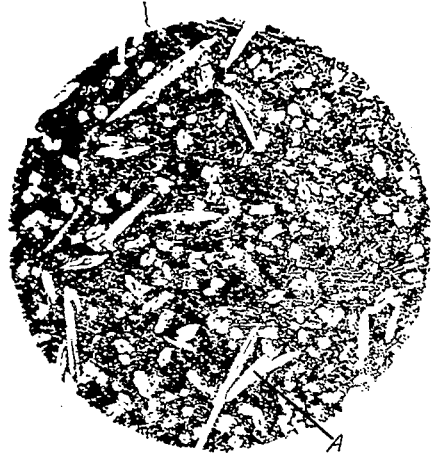

Figure 5 is a photomicrograph of an alloy consisting of 59.76% cadmium, 30.24% zinc and 10% antimony, the cadmium and zinc being in the ratio to form 72% by weight of the total alloy, which would be supplemented by 18% excess zinc and by 10% of antimony. These ratios of the constituents in the photomicrographs are modified somewhat by the combination of antimony with cadmium or zinc to form compounds.

Figure 6:
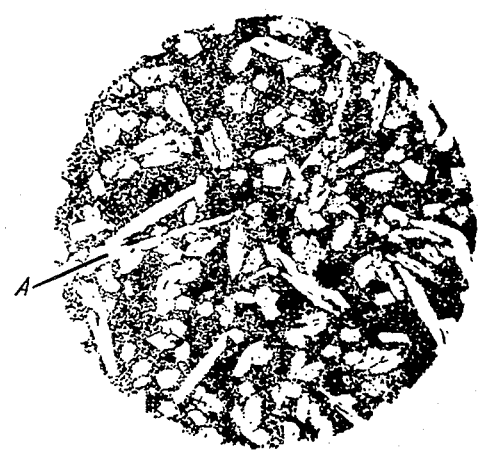

Figure 6 is a photomicrograph of an alloy consisting of 55.61% cadmium, 29.39% zinc and 15% antimony, the cadmium and zinc being in the proportion to form a cadmium-zinc eutectic matrix, which would constitute 67% by weight of the total alloy, and which would be supplemented by 18% excess zinc and by 15% antimony. The actual structures in the photomicrographs are somewhat modified by the combination of the antimony with the cadmium or zinc to form compounds.

Figure 7:
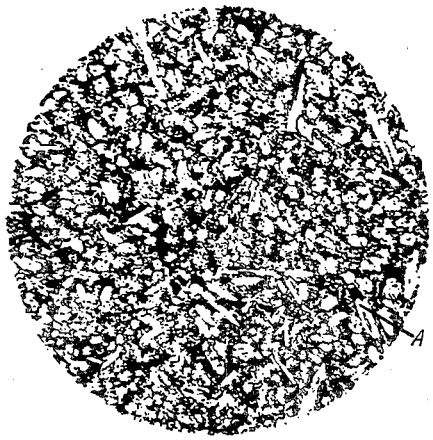

Figure 7 is a photomicrograph of an alloy of the same general composition as that shown in Figure 5, except that it has been modified by the addition of about 1/5 of 1% of magnesium.

Figure 8:
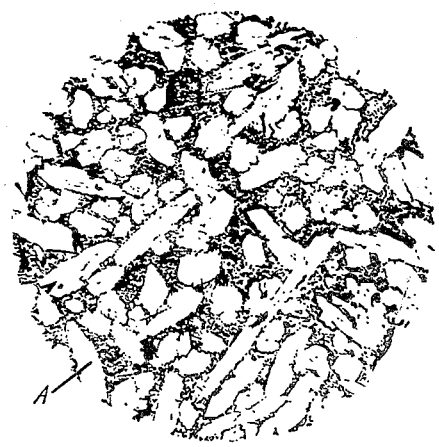

Figure 8 is a photomicrograph of an alloy consisting of 49.81% cadmium, 30.20% zinc and 20% antimony, the cadmium and zinc being in the proportion to form a cadmium-zinc eutectic matrix, which would be 60% by total weight of the alloy, and which would be supplemented by 20% excess zinc and 20% antimony, the structures in the photomicrographs being slightly modified due to the combination of antimony with cadmium or zinc to form compounds.

Comparing Figure 2, which embodies 85% cadmium-zinc eutectic structure plus 10% excess zinc plus 5% antimony with Figure 1 which shows the eutectic structure alone, it will be seen that in Figure 2, hard particles of antimony-compound appear at A and that dark dendrites which are the zinc in excess of that required to form the eutectic, are seen at B.

Referring to the drawings, and comparing Figure 3, which embodies the eutectic matrix plus 5% antimony, with Figure 1 which represents the eutectic structure alone, it will be noted that the antimony-compound appears in the alloy as small symmetrical particles A of what is probably an antimony-compound with cadmium or zinc.

Comparing Figure 4, which embodies the eutectic matrix plus 15% antimony, with Figure 2, it will be noted that the antimony-compound appears in the alloy as portions A of comparatively increased size and some of the particles are of more or less elongated, needle-like or blade-like form.

Referring to Figure 5, which represents an alloy wherein the eutectic structure is supplemented by excess zinc while the proportion of antimony is less than that contained in the alloy of Figure 4, it will be noted that some of the particles A of antimony-compound are, nevertheless, of still more elongated form, probably being in combination with the excess zinc to some extent.

Referring to Figure 6, where the eutectic structure is proportionately less than in the alloy shown in Figure 4, while the antimony is proportionately increased, in comparison to Figure 5, it will be noticed that the antimony-compound particles A are larger and more prominent in the structure.

Referring to Figure 7, where the alloy is similar to the alloy of Figure 6, except that it is supplemented by ⅕ of 1% of magnesium, the antimony-compound particles are designated A and are of somewhat smaller size than in Figure 5. The magnesium may be in compound with the cadmium or zinc.

Referring to Figure 8, where the excess zinc and the antimony-compound are proportionately greater than the structure of Figure 6, a greater proportion of the antimony-compound particles A have apparently been produced. Figure 8 shows an alloy rather too high in antimony for those uses where extreme freedom from brittleness may be desired, but illustrates how by varying the proportions of the alloying elements these alloys may be graduated in structure and in resultant properties, according to the use to which they are to be put. For the main purposes of our invention, the alloy of Figure 8 contains too much antimony and zinc and not enough cadmium for optimum results although for certain types of bearing service it may be desirable.

It will be seen from this discussion of the various figures of the drawings, that the variations of proportions of the cadmium, zinc and antimony, as well as the addition of magnesium, results in a variation in the appearance of the micro-structure of the alloy. This, in itself, raises the inference that variations in these proportions produces variation in the structural characteristics of the alloy, in addition to the appearance thereof. And our experiments and tests have shown this to be the case.

For example, we have found that for many services where high pressures or speeds are to be encountered, too much excess cadmium is undesirable, since it renders the alloy subject to surface displacement, which is sometimes referred to as "wiping". Thus, we normally prefer to avoid excess cadmium, though a small amount of excess cadmium is within the boundary of our invention.

Likewise, we consider that too much excess zinc is undesirable in our alloy, since the cadmium-zinc eutectic structure possesses greater toughness than the zinc alone. Therefore, though a certain proportion of excess zinc stiffens the alloy to a desirable extent for bearing purposes, we consider it important that the excess zinc be limited to such an extent that it will not form large patches of excess zinc, which are more brittle than smaller particles, and which will render the alloy, as a whole, undesirably brittle.

Also, we have found that the use of too high a proportion of antimony in our cadmium-zinc alloy, will undesirably increase the amount of the antimony portions and will, consequently, increase the brittleness of the alloy for bearing purposes to an undesirable extent. Therefore, the amount of antimony should also be limited. It is merely necessary to use a sufficient proportion thereof to insure an adequate quantity of dispersed hard particles which should not be so large as to materially decrease the conformability of the bearing as a whole.

Thus, in making our bearing alloy, we preferably use cadmium as the largest constituent, with zinc in sufficient proportion thereto to complete the eutectic structure and to provide a small amount of excess zinc, and with antimony in such proportion that it will produce the desired amount of small particles, probably antimony compounds. Such a compound is shown in Figure 2, wherein the alloy is, as previously stated, formed of 85% cadmium-zinc eutectic structure, 10% excess zinc and 5% antimony compounds.

However, our cadmium-zinc base alloy will still retain its superiority, from the standpoint of toughness, conformability, hardness and heat resistance under considerable change in proportions of the metal as indicated.

In addition, the range of proportions of the various metals used in our alloy, may be extended beyond the ranges shown and described, while still retaining superiority of the bearing alloy as to some or all of the features of toughness, conformability, hardness and heat resistance. As a matter of fact, in a ternary alloy, we prefer to keep our alloy preponderatingly of cadmium, using not more than 90% of cadmium, lest the alloy be too malleable or ductile, and not less than 60%, lest it be too brittle. Furthermore, in such an alloy, we prefer that there be not less than 10% zinc, lest the alloy be too malleable or ductile, nor more than 40% zinc, lest it be too brittle. The amount of antimony used, in a ternary alloy, made in accordance with our invention, may range from ¼% to 20%, depending upon the type of service for which the bearing is to be used.

For example, a ternary alloy for use in bearings for low pressure and low speed service may be provided with the necessary amount of hard, dispersed particles of antimony-compounds by the introduction of ¼ of one percent of antimony. For use in bearings for high pressure or high speed service, as much as 20% of antimony can be utilized, though more than 15% is ordinarily not desirable. In fact, for most purposes, we prefer about 3 to 8 percent of antimony.

Our experiments and tests indicate that it is desirable to introduce sufficient zinc to produce the cadmium-zinc eutectic plus a sufficient excess of zinc to supply the necessary stiffening effect to the matrix, but not so much as to make it brittle. It is believed that the antimony combines with a portion of the excess zinc to produce an antimony-zinc compound. However, we consider it undesirable to use the maximum amount of zinc indicated if the maximum amount of antimony is used, nor vice versa.

Though antimony is the preferred metal used by us together with cadmium and zinc in the formation of our bearing alloy, there are other metals which may be substituted therefor or even used in addition thereto. These other metals may be defined as those metals which will form a stable intermetallic compound with cadmium or zinc while maintaining a melting point not substantially lower and a degree of hardness no lower than the cadmium-zinc eutectic. If such an element is substituted for antimony, it should not exceed 20% and preferably should be less than 15% of the entire composition or, if it is used in addition to antimony, the total of the two should not exceed 15% of the entire composition.

Some of the metals which may be used as alloying elements instead of, or in combination with, the antimony are magnesium, copper, arsenic, nickel, calcium, sodium, potassium, tellurium, aluminum, cobalt, manganese or iron. Some of these metals will combine only with the cadmium, some only with the zinc and some with both the cadmium and the zinc. Though we have not, to date, been able to run tests as to all of these metals, the known characteristics thereof indicate that they are capable of use in the manner indicated and we believe that the use of any metal in this group in the indicated manner is within the scope of our invention.

It will be seen from this that we have invented an alloy for bearings or bearing linings which comprises a matrix having distinct superiority from the standpoint of heat resistance, toughness and conformability. Thus, the eutectic melting point is high. Furthermore, in the eutectic, the cadmium modifies the brittleness of the zinc while the zinc hardens and stiffens the cadmium, thus producing a combination of desirable properties. In addition, the excess zinc, if used, produces a stiffening of the matrix. The net result is that the matrix has a comparatively high heat resistance, and a high degree of toughness and conformability.

In addition, our superior matrix is amply adequate to hold, without loss of desirable properties, the necessary quantity of small hard particles. These hard particles, being formed by the introduction of a metal which will form a stable intermetallic compound with the cadmium or zinc with a melting point not substantially lower and a degree of hardness no lower than the cadmium-zinc eutectic, contribute the requisite degree of hardness to the alloy and, yet, are sufficiently small that they do not impart brittleness thereto or materially detract from the conformability thereof.

Having thus described our invention, what we claim is:

1. A bearing alloy comprising 95% by weight of the cadmium-zinc eutectic and 5% by weight of antimony.

2. A bearing alloy comprising 85% by weight of the cadmium-zinc eutectic and 15% by weight of antimony.

3. A bearing material comprising essentially a base consisting of a cadmium-zinc eutectic matrix in combination with a metal of the group comprising magnesium, copper, antimony, arsenic, said metal being present in an appreciable amount not exceeding 20% of the total amount of the matrix comprising said base.

4. A bearing material comprising essentially a base consisting of a cadmium-zinc eutectic matrix in combination with a metal of the group comprising magnesium, copper, antimony, arsenic, said metal being present in an amount ranging from 5% to 20% of the total amount of the matrix comprising said base.

5. A bearing alloy comprising in combination 67% to 95% by weight of a cadmium-zinc eutectic matrix and an appreciable amount up to and not exceeding 20% by weight of a metal of the group comprising magnesium, copper, antimony, arsenic.

6. A bearing alloy comprising in combination 67% to 95% by weight of a cadmium-zinc eutectic matrix and 5% to 20% by weight of a metal of the group comprising magnesium, copper, antimony, arsenic.

7. A bearing material comprising essentially a base consisting of a cadmium-zinc eutectic matrix in combination with zinc, and a metal of the group comprising magnesium, copper, antimony, arsenic, the zinc and said metal each being present in an appreciable quantity such that the amount of each does not exceed 20% of the total amount of the matrix comprising said base.

8. A bearing material comprising 67% to 95% by weight of a cadmium-zinc eutectic matrix, and in combination therewith, an appreciable amount not exceeding 20% by weight of zinc, and an appreciable amount not exceeding 20% by weight of a metal of the group comprising magnesium, copper, antimony, arsenic.

9. A bearing alloy comprising not more than 90% and not less than 60% cadmium, not more than 40% and not less than 10% zinc and not more than 20% and not less than ¼% of antimony.

In testimony whereof, we hereby affix our signatures.

HORACE W. GILLETT.
HOWARD C. CROSS.